United States Patent
Shimazawa

(10) Patent No.: US 7,680,338 B2
(45) Date of Patent: Mar. 16, 2010

(54) IMAGE PROCESSING APPARATUS, IMAGE READING APPARATUS AND IMAGE RECORDING APPARATUS

(75) Inventor: Yohichi Shimazawa, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1152 days.

(21) Appl. No.: 11/283,166

(22) Filed: Nov. 17, 2005

(65) Prior Publication Data
US 2006/0109521 A1    May 25, 2006

(30) Foreign Application Priority Data
Nov. 19, 2004   (JP) .............................. 2004-336312

(51) Int. Cl.
    G06K 9/46    (2006.01)
(52) U.S. Cl. ..................................... 382/194
(58) Field of Classification Search ............... None
    See application file for complete search history.

(56) References Cited

U.S. PATENT DOCUMENTS

| | | | | |
|---|---|---|---|---|
| 4,739,377 A | * | 4/1988 | Allen | 355/133 |
| 4,977,603 A | * | 12/1990 | Irie et al. | 382/218 |
| 5,216,724 A | * | 6/1993 | Suzuki et al. | 382/135 |
| 5,515,451 A | * | 5/1996 | Tsuji et al. | 382/135 |
| 5,629,990 A | * | 5/1997 | Tsuji et al. | 382/324 |
| 6,539,114 B1 | * | 3/2003 | Shimazawa | 382/195 |
| 6,813,381 B2 | | 11/2004 | Ohnishi et al. | |

FOREIGN PATENT DOCUMENTS

| | | |
|---|---|---|
| CN | 1315715 | 10/2001 |
| JP | 05-85158 | 11/1993 |
| JP | 06-070157 | 3/1994 |
| JP | 06-178098 | 6/1994 |
| JP | 07-322062 | 12/1995 |
| JP | 2003-099788 | 4/2003 |

* cited by examiner

*Primary Examiner*—Bhavesh M Mehta
*Assistant Examiner*—Alex Liew
(74) *Attorney, Agent, or Firm*—David G. Conlin; Steven M. Jensen; Edwards Angell Palmer & Dodge LLP

(57) ABSTRACT

An image processing apparatus for receiving image data composed of a plurality of pixels, extracting an area from an image based on the received data and detecting a type of an image included in the extracted area, includes means for calculating the ratio of pixels having a predetermined pixel value to pixels constituting the area, and detects the type of the image included in the area, based on the calculated ratio of pixels.

16 Claims, 15 Drawing Sheets

| | RANGE OF THE NUMBER OF PIXELS | |
|---|---|---|
| | 1ST CRITERION | 2ND CRITERION |
| 1ST DIVISIONAL AREA | 280≦BLACK≦320 | 252≦BLACK≦352 |
| 2ND DIVISIONAL AREA | 290≦BLACK≦330 | 261≦BLACK≦363 |
| 3RD DIVISIONAL AREA | 290≦BLACK≦330 | 261≦BLACK≦363 |
| 4TH DIVISIONAL AREA | 480≦BLACK | 432≦BLACK |

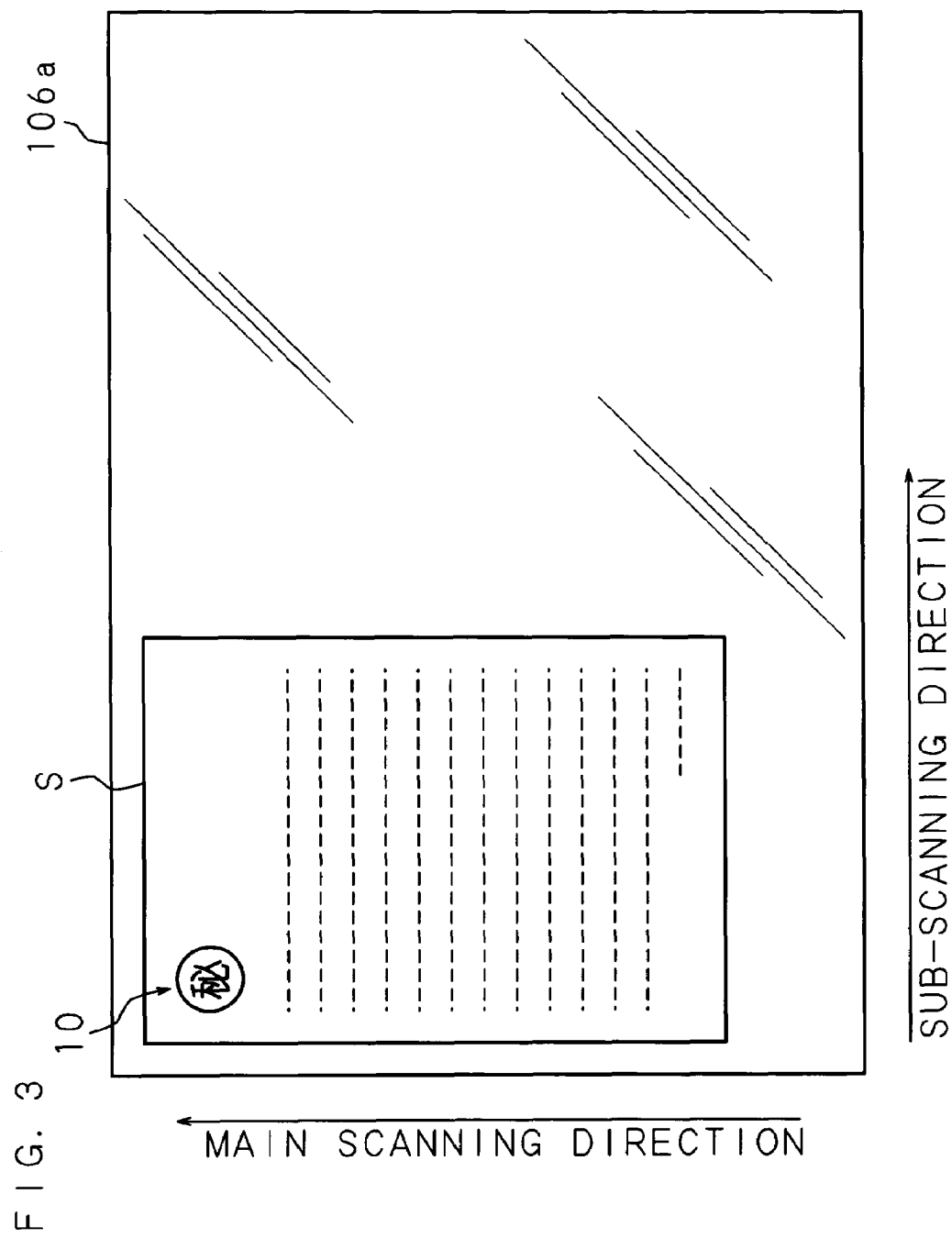

FIG. 4A  FIRST DETECTION PATTERN
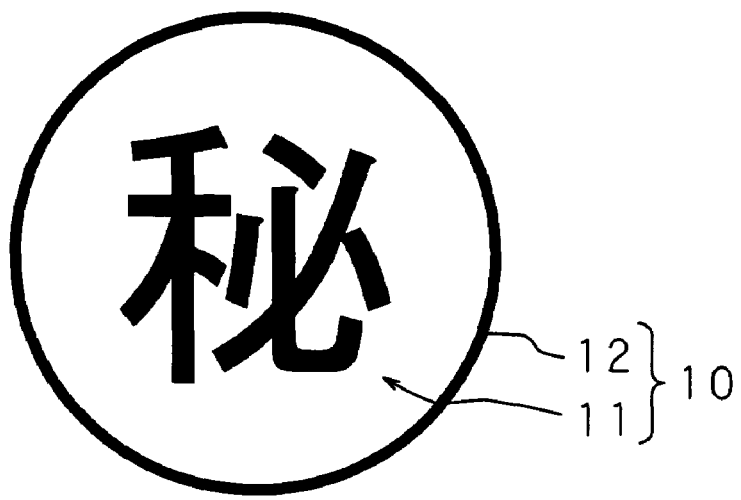
FIG. 4B  SECOND DETECTION PATTERN
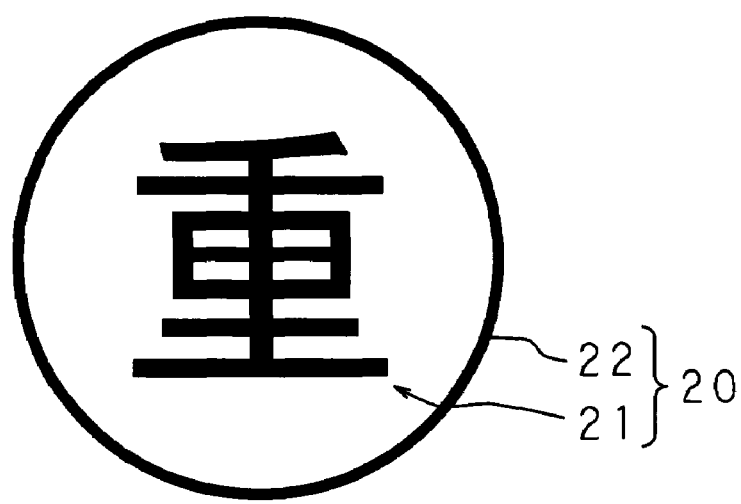

| | 1ST LINE | 2ND LINE | 3RD LINE | 4TH LINE | 5TH LINE | 6TH LINE |
|---|---|---|---|---|---|---|
| 1ST AREA | 9≦BLACK | BLACK≦1 | BLACK≦1 | BLACK≦1 | BLACK≦1 | BLACK≦1 |
| 2ND AREA | BLACK≦2 | 3≦BLACK | 3≦BLACK | 1≦BLACK | 2≦BLACK | 1≦BLACK |
| 3RD AREA | BLACK≦1 | BLACK≦1 | BLACK≦1 | BLACK≦1 | BLACK≦1 | BLACK≦1 |

| | RANGE OF THE NUMBER OF PIXELS | |
|---|---|---|
| | 1ST CRITERION | 2ND CRITERION |
| 1ST DIVISIONAL AREA | 280≦BLACK≦320 | 252≦BLACK≦352 |
| 2ND DIVISIONAL AREA | 290≦BLACK≦330 | 261≦BLACK≦363 |
| 3RD DIVISIONAL AREA | 290≦BLACK≦330 | 261≦BLACK≦363 |
| 4TH DIVISIONAL AREA | 480≦BLACK | 432≦BLACK |

|  | RANGE OF THE NUMBER OF PIXELS | |
|---|---|---|
|  | 1ST CRITERION | 2ND CRITERION |
| DIVISIONAL AREA | 280≦BLACK≦320 | 252≦BLACK≦352 |

FIG. 13

| | RANGE OF THE NUMBER OF PIXELS nTH CRITERION (n = 1, 2, 3, ...) |
|---|---|
| 1ST DIVISIONAL AREA | 280 {1− (n−1) ×0.1} ≦BLACK ≦320 {1+ (n−1) ×0.1} |
| 2ND DIVISIONAL AREA | 290 {1− (n−1) ×0.1} ≦BLACK ≦320 {1+ (n−1) ×0.1} |
| 3RD DIVISIONAL AREA | 290 {1− (n−1) ×0.1} ≦BLACK ≦320 {1+ (n−1) ×0.1} |
| 4TH DIVISIONAL AREA | 480 {1− (n−1) ×0.1} ≦BLACK |

| DETECTION PATTERN | RANGE OF THE NUMBER OF PIXELS |
|---|---|
| c | $a1 \leqq BLACK \leqq b1$ |
| o | $a2 \leqq BLACK \leqq b2$ |
| d | $a3 \leqq BLACK \leqq b3$ |
| q | $a4 \leqq BLACK \leqq b4$ |

F I G. 15A

P

F I G. 15B

| DETECTION PATTERN | RANGE OF THE NUMBER OF PIXELS |
|---|---|
| P | $c1 \leqq BLACK \leqq d1$ |
| R | $c2 \leqq BLACK \leqq d2$ |

IMAGE PROCESSING APPARATUS, IMAGE READING APPARATUS AND IMAGE RECORDING APPARATUS

CROSS-REFERENCE TO RELATED APPLICATION

This non-provisional application claims priority under 35 U.S.C. § 119(a) on Patent Application No. 2004-336312 filed in Japan on Nov. 19, 2004, the entire contents of which are hereby incorporated by reference.

BACKGROUND OF THE INVENTION

1. Field of the Invention

The present invention relates to an image processing apparatus, an image reading apparatus and an image recording apparatus having the function of detecting a predetermined pattern from an image including the pattern.

2. Description of Related Art

Conventionally, in order to prevent copying of banknotes, securities and so on, image reading apparatus, such as an image scanner, and image recording apparatus, such as a copying machine, incorporate a memory for storing some characteristics of banknotes, etc., and an ASIC (image processing apparatus) for detecting specific images such as banknotes by comparing an inputted image with images stored in the memory and performing pattern matching, and prohibits copying if a specific image such as a banknote is detected (see, for example, Japanese Utility Model Application Laid-Open No. 05-85158, and Japanese Patent Applications Laid-Open No. 06-178098 and No. 2003-99788).

For example, Japanese Utility Model Application Laid-Open No. 05-85158 discloses an image processing apparatus for detecting a circular image such as a banknote's red seal. When a red pixel is detected in a main scanning direction of an image read, first, the image processing apparatus performs a thinning process on the image composed of a plurality of red pixels. Thereafter, when the image processing apparatus detects another red pixel at a position separated from the position of the thinned image by a predetermined distance in the main scanning direction, it supposes that the red pixel detected first and the red pixel detected next correspond to both end positions of a line segment that is a diameter of the circle, and then turns the line segment by a predetermined angle in the main scanning direction. If the positions of the two pixels on both sides of the line segment are within a predetermined range of the positions of the pixels stored in the memory, the image processing apparatus determines that the red pixels are an image having a circular outer circumference (red seal image).

Moreover, in an image processing apparatus disclosed as a similar technique in Japanese Patent Application Laid-Open No. 06-178098, when pixels corresponding to both ends of a line segment that is a diameter of a circle in the main scanning direction are detected and a part of the circle is detected at a position separated from the center of the circle by a predetermined distance in a sub-scanning direction, the image processing apparatus determines that the detected pixels are part of an image to be detected. Further, the image processing apparatus counts the number of times the pixels within a predetermined distance in the detected circle are turned on, namely the number of red pixels, and determines whether or not the counted value is equal to a numerical value corresponding to specific image data pre-stored in a memory. If they are equal, the image processing apparatus determines that the image formed by the detected pixels is a specific circular image (red seal image).

However, in the image processing apparatus disclosed in Japanese Utility Model Application Laid-Open No. 05-85158, by detecting a red seal image, the detected image is determined to be a red seal image formed on a banknote. Thus, although this image processing apparatus is simple and convenient, it often determines an image similar to a red seal image to be the red seal image, and has the problem of very poor determination accuracy.

On the other hand, the image processing apparatus disclosed in Japanese Patent Application Laid-Open No. 06-178098 counts red pixels in a detected red circle, and compares a counted number using a specific image pre-stored in the memory with a counted number using an externally inputted image. Therefore, this image processing apparatus has high determination accuracy, but it is necessary to store the specific image, and the storage capacity of the memory increases. Moreover, since comparison means for performing a high-speed comparing process on such large-volume data is required, this image processing apparatus has drawbacks that a comparison circuit in the image processing apparatus is complicated and the manufacturing cost of the image processing apparatus is high.

Further, in Japanese Patent Application Laid-Open No. 2003-99788, the applicant of this application proposed an image processing apparatus for extracting a target image portion to be extracted, which is included in an image to be processed. This image processing apparatus comprises determining means for determining whether or not a part of a specific image segment of a target image portion is included in an image to be processed, and confirming means for confirming whether or not a target image portion candidate including the specific image segment is the target image portion when a determination is made that the specific image segment is included in the image to be processed, and proposes a technique for detecting a specific target image with high accuracy. However, this does not realize the detection of a plurality of specific images by a simple circuit structure.

BRIEF SUMMARY OF THE INVENTION

The present invention has been made with the aim of solving the above problems, and it is an object of the invention to provide an image processing apparatus, an image reading apparatus and an image recording apparatus capable of accurately detecting a plurality of detection patterns even when they do not incorporate a large-capacity memory.

An image processing apparatus according to the present invention is an image processing apparatus for receiving image data composed of a plurality of pixels, extracting an area from an image based on the received image data and detecting a type of an image included in the extracted area, and characterized by comprising means for calculating the ratio of pixels having a predetermined pixel value to pixels constituting the above-mentioned area, wherein the type of the image included in the area is detected based on the calculated ratio of pixels.

In this invention, the ratio of pixels having a predetermined pixel value to pixels constituting the extracted area is calculated, and the type of an image included in the area is detected based on the calculated ratio of pixels. Therefore, it is not necessary to extract features of the image when detecting the type of the image included in the extracted area, and the type is discriminated by counting the number of pixels having the predetermined value.

An image processing apparatus according to the present invention is characterized by comprising a table defining a relation between a type of an image to be detected and the ratio of pixels having the above-mentioned pixel value in the area including the image, wherein the type of the image is detected by referring to the relation defined in the table.

In this invention, the image processing apparatus comprises a table defining the relation between a type of an image to be detected and the ratio of pixels having a pre-determined pixel value in the area including the image, and detects the type of the image by referring to the table. Therefore, by counting the number of the pixels having the predetermined value, the type of the image included in the extracted area is discriminated.

An image processing apparatus according to the present invention is characterized by comprising: means for receiving information about the relation; and means for changing the table based on the received information.

In this invention, the image processing apparatus receives information about the relation between a type of an image to be detected and the ratio of pixels having a predetermined value in an area including the image, and changes the table based on the received information. Therefore, even when the types of images to be discriminated are increased, it is possible to easily cope with the increase.

An image reading apparatus according to the present invention is characterized by comprising: reading means for reading an image recorded on a sheet; and any one of the above-described image processing apparatuses defined by the invention, wherein an area is extracted from an image read by the reading means, and a type of an image included in the extracted area is detected.

In this invention, the image reading apparatus comprises reading means for reading an image recorded on a sheet and the above-described image processing apparatus, extracts an area from the read image, and detects the type of an image included in the extracted area. Therefore, this invention is applicable to image reading apparatuses.

An image reading apparatus according to the present invention is characterized by comprising: means for determining whether or not the type of the image detected by the image processing apparatus is a predetermined type; and means for outputting information indicating a determination result when a determination is made that the detected type is the predetermined type.

In this invention, when a determination is made that the detected type is the predetermined type, information indicating this is outputted. Therefore, a process to be performed in the image reading apparatus can be decided based on the information, and it is possible to notify the user of this.

An image recording apparatus according to the present invention is characterized by comprising: an image reading apparatus defined by the above-described invention; and means for recording an image read by the image reading apparatus on a sheet.

In this invention, the image recording apparatus comprises the above-described image reading apparatus, and means for recording an image read by the image reading apparatus on a sheet. Therefore, this invention is applicable to image recording apparatuses such as a printer and a digital multi-function machine.

An image recording apparatus according to the present invention is characterized by comprising: means for determining whether or not the type of the image detected by the image reading apparatus is a predetermined type; and means for prohibiting recording of the image read by the image reading apparatus on a sheet when a determination is made that the detected type is the predetermined type.

In this invention, when a determination is made that the detected image is of the predetermined type, recording of the read image on a sheet is prohibited, and therefore it is possible to prohibit copying of a document including a predetermined pattern.

An image recording apparatus according to the present invention is characterized by comprising: means for determining whether or not the type of the image detected by the image reading apparatus is a predetermined type; means for receiving information about a user when a determination is made that the detected type is the predetermined type; means for authenticating the user based on the received information; and means for prohibiting recording of the image read by the image reading apparatus on a sheet when a determination is made that the user cannot be authenticated by the means.

In this invention, when a determination is made that the detected image is of the predetermined type, a decision as to whether or not to permit recording of the image is made after authenticating the user. It is therefore possible to prohibit people other than a predetermined user from copying the document.

According to this invention, the ratio of pixels having a predetermined pixel value to pixels constituting the extracted area is calculated, and the type of an image included in the area is detected based on the calculated ratio of pixels. Therefore, it is not necessary to extract features of the image when detecting the type of the image included in the extracted area, and it is possible to discriminate the type by counting the number of pixels having the predetermined value. In other words, it is not necessary to make the circuit structure complicated to discriminate the type of the image, and the type of the image can be discriminated with a simple structure.

According to the present invention, a table defining the relation between a type of an image to be detected and the ratio of pixels having a pre-determined pixel value in an area including the image is provided, and the type of the image is detected by referring to the table. Therefore, by counting the number of the pixels having the predetermined value, it is possible to discriminate the type of the image included in the extracted area.

According to the present invention, information about the relation between a type of an image to be detected and the ratio of pixels having a predetermined value in an area including the image is received, and the table is changed based on the received information. Therefore, even when the types of images to be discriminated are increased, it is possible to easily cope with the increase.

According to the present invention, reading means for reading an image recorded on a sheet and the above-described image processing apparatus are incorporated, an area is extracted from the read image, and the type of an image included in the extracted area is detected. Therefore, the present invention is applicable to image reading apparatuses.

According to the present invention, when a determination is made that the detected type is the predetermined type, information indicating this is outputted. Therefore, a process to be performed in the image reading apparatus can be decided based on the information, and it is possible to notify the user of this.

According to the present invention, the above-described image reading apparatus and means for recording an image read by the image reading apparatus on a sheet are incorporated. Therefore, the present invention is applicable to image recording apparatuses such as a printer and a digital multi-function machine.

According to the present invention, when a determination is made that the detected image is of the predetermined type, recording of the read image on a sheet is prohibited. It is therefore possible to prohibit copying of a document including a predetermined pattern.

According to the present invention, when a determination is made that the detected image is of the predetermined type, a decision as to whether or not to permit recording of the image is made after authenticating the user. It is therefore possible to prohibit people other than a predetermined user from copying the document.

The above and further objects and features of the invention will more fully be apparent from the following detailed description with accompanying drawings.

BRIEF DESCRIPTION OF THE SEVERAL VIEWS OF THE DRAWINGS

FIG. 3 is an explanatory view for explaining the state when reading a document;

FIGS. 4A and 4B are schematic views showing the structures of detection patterns;

FIG. 8 is a table showing a determination condition based on the template;

FIG. 13 is a conceptual view showing a table specifying divisional areas and the range of the number of pixels;

FIGS. 15A and 15B are explanatory views for explaining another example of a detection pattern detected in this embodiment.

DETAILED DESCRIPTION OF THE INVENTION

The following description will specifically explain a digital multi-function machine as an application example of an image processing apparatus, an image reading apparatus and an image recording apparatus of the present invention, based on the drawings illustrating some embodiments thereof.

Embodiment 1

Figure 1:
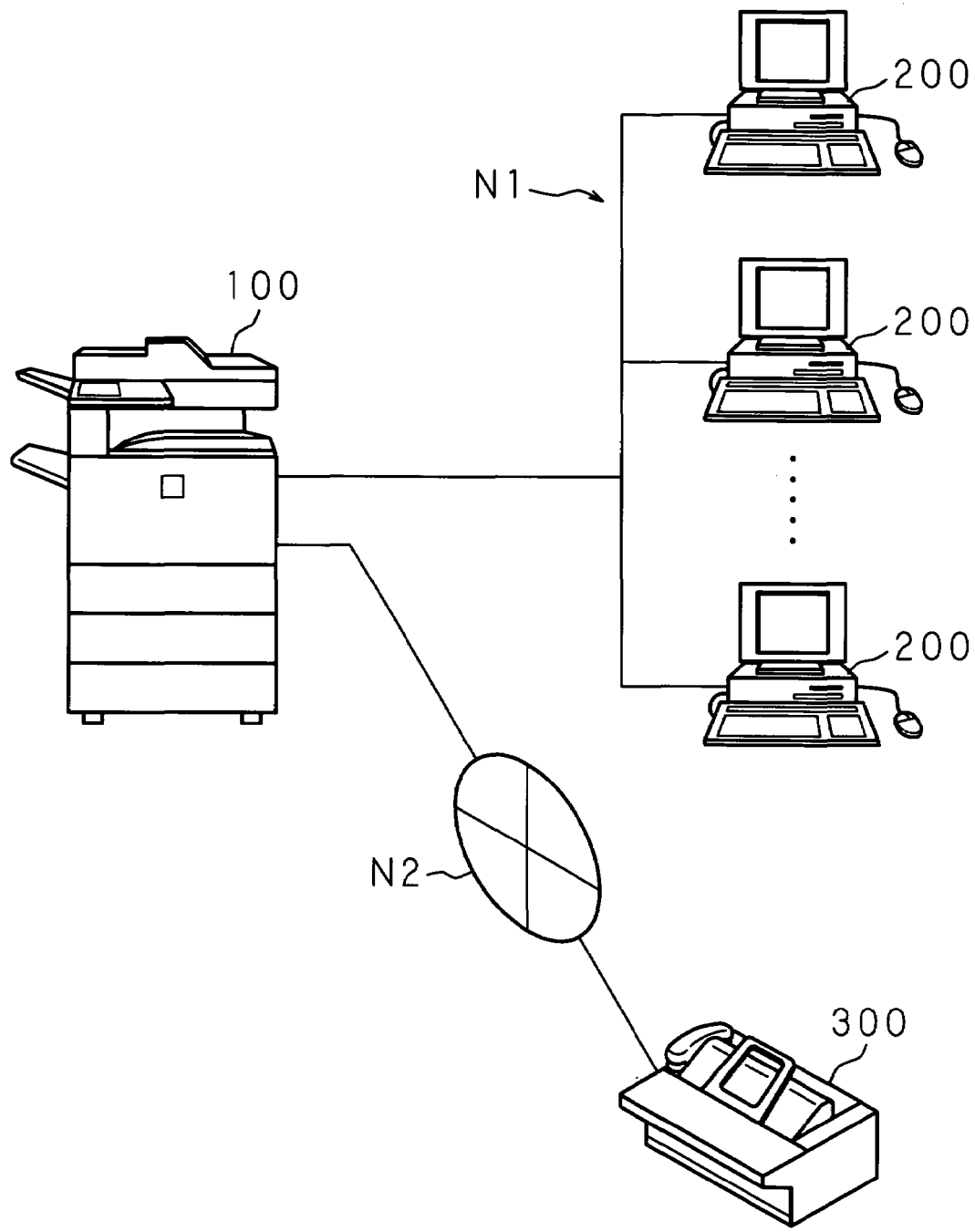
FIG. 1 is a schematic view for explaining the structure of an image recording system including a digital multi-function machine of this embodiment.

FIG. 1 is a schematic view showing the structure of an image recording system of the present invention including a digital multi-function machine of this embodiment. In FIG. 1, 100 represents a digital multi-function machine of this embodiment to which information processors 200, 200, . . . , 200 such as a personal computer and a work station, are connected through a communication network N1, and an external facsimile machine 300 is connected through a facsimile communication network N2.

A driver program (printer driver) for using the digital multi-function machine 100 through the communication network N1 is preinstalled in the information processor 200 so that an output process is executed by generating print data and transmitting the generated print data by the printer driver to the digital multi-function machine 100. When the digital multi-function machine 100 receives the print data transmitted from the information processor 200, it generates image data for output according to the print data, and records an image on a sheet of paper, OHP film or the like (hereinafter simply referred to as paper), based on the generated image data.

The facsimile machine 300 is capable of transmitting coded facsimile data to the digital multi-function machine 100 through the facsimile communication network N2. When the digital multi-function machine 100 receives facsimile data transmitted from the facsimile machine 300, it decodes the facsimile data to obtain image data for output. Then, the digital multi-function machine 100 records an image on paper based on the obtained image data.

Moreover, the digital multi-function machine 100 has a copy function in addition to the above-mentioned print function and facsimile function. In other words, the digital multi-function machine 100 incorporates an image reading section 106 (see FIG. 2) comprising a CCD line sensor (CCD: Charge Coupled Device), optically reads an image recorded on a document, and records an image on paper based on image data obtained by the image reading section 106.

The digital multi-function machine 100 of this embodiment determines, based on inputted image data, whether or not a predetermined pattern is included. According to the determination result, the digital multi-function machine 100 prohibits the output process, or permits the output process after authenticating a user.

Figure 2:
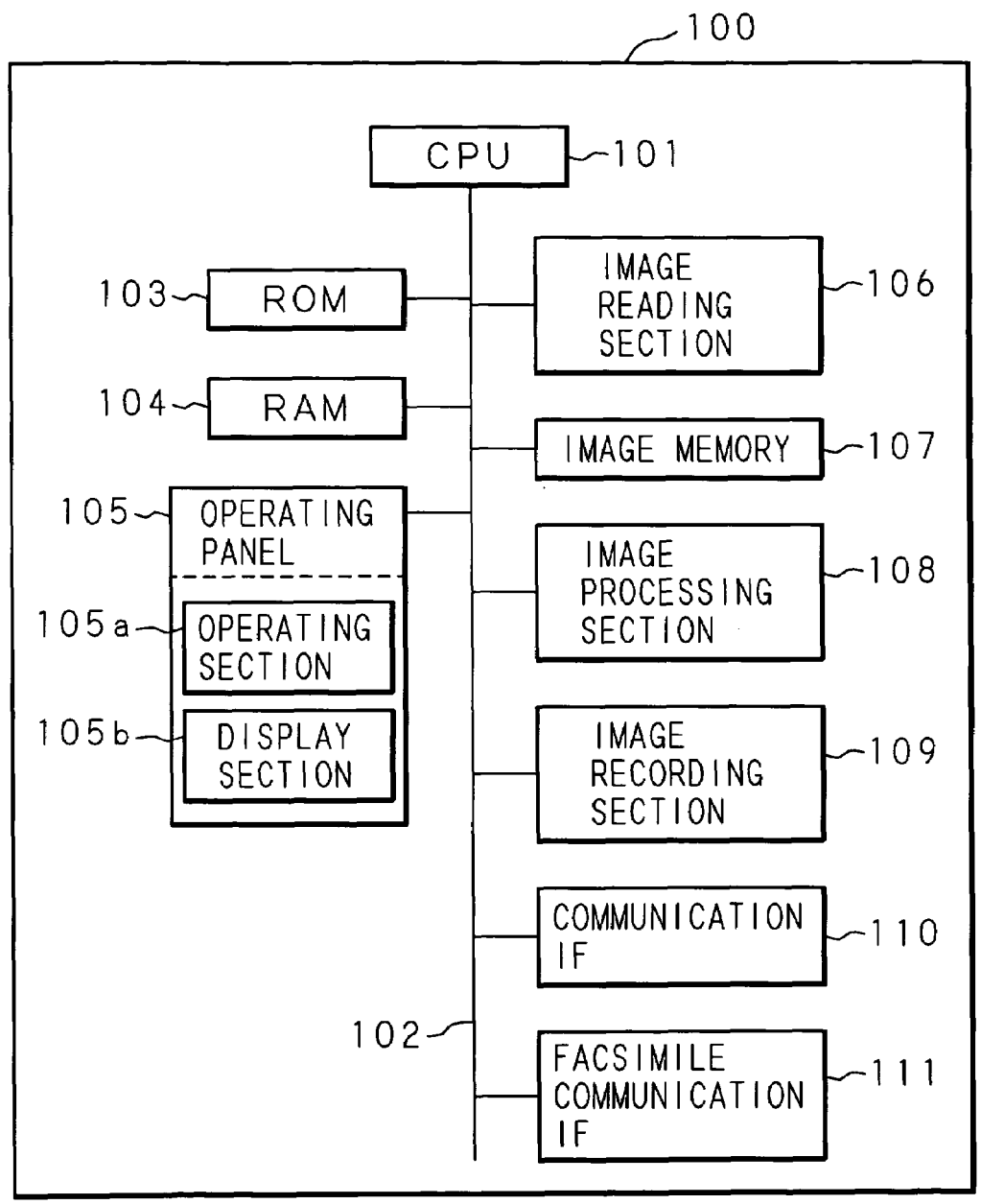
FIG. 2 is a block diagram showing the internal structure of the digital multi-function machine.

FIG. 2 is a block diagram showing the internal structure of the digital multi-function machine 100. The digital multi-function machine 100 comprises a CPU 101. By loading a control program stored in a ROM 103 into a RAM 104 and executing it, the CPU 101 controls various hardware devices connected to a bus 102 to function as an image processing apparatus, an image reading apparatus, or an image recording apparatus of the present invention.

The following description will explain the structures of various hardware devices connected to the bus 102. An operating panel 105 is composed of an operating section 105a for receiving an operating instruction from a user, and a display section 105b for displaying information to be given to a user. The operating section 105a comprises various hardware keys, and receives a function switching operation and settings about the number of prints, the density of recording an image, etc. The display section 105b comprises a liquid crystal display, an LED display or the like, and displays the operation state of the digital multi-function machine 100 and setting values inputted through the operating section 105a. Moreover, touch-panel type software keys are arranged in a part of the display section 105b to receive user's selecting operation.

The image reading section 106 comprises a document mounting 106a made of glass for mounting a document (see FIG. 3), a light source for irradiating light on a document to be read, a CCD line sensor for optically reading an image, and an AD converter for converting an analog image signal outputted by the CCD line sensor into a digital signal. In the image reading section 106, digital image data is obtained by focusing an image of a document set at a predetermined reading position on the document mounting 106a onto the CCD line sensor, converting an analog signal outputted by the CCD line sensor into a digital signal, and correcting the obtained digital signal with respect to the light distribution characteristic of the light source and the irregularity of the sensitivity of the CCD line sensor when reading the document. This image data is composed of a plurality of pixels, and each pixel has 256 levels for each of RGB colors and thus has 16777216 levels (color scales).

An image memory 107 is a volatile semiconductor memory, and temperately stores image data outputted from the image reading section 106, and image data outputted from a later-described communication IF 110 and facsimile communication IF 111. The image memory 107 stores these image data by one page, and transfers the image data to an image processing section 108, or an image recording section 109, according to an instruction from the CPU 101.

The image processing section 108 comprises a memory and an arithmetic circuit (not shown), and determines whether or not the image data includes a specific mark, based on image data transferred from the image reading section 106 via the image memory 107. Therefore, the image processing section 108 performs the process of binarizing the transferred image data, the process of extracting an area as a candidate of an object to be detected (hereinafter referred to as a detection area) based on the binarized image data, and the process of determining the type of a mark included in the detection area. In this embodiment, it is possible to detect two types of marks (hereinafter referred to as the first detection pattern and the second detection pattern), and, when the image processing section 108 determines that the image data includes a specific mark, it is possible to detect the type of the mark. The respective processes executed by the image processing section 108 will be described in detail later.

The image recording section 109 records an image on paper, based on image data transferred from the image memory 107. Therefore, the image recording section 109 comprises a charger for charging a photoconductive drum to a predetermined potential, a laser write device for creating an electrostatic latent image on the photoconductive drum by emitting laser light according to image data received from outside, a developing device for visualizing the image by supplying toner to the electrostatic latent image formed on the photoconductive drum surface, and a transfer device (not shown) for transferring the toner image formed on the photoconductive drum surface onto paper, and records an image desired by the user on paper by an electrophotographic method. Note that it may be possible to record an image by an ink jet method, a thermal transfer method, a sublimation method, etc. as well as the electrophotographic method using a laser write device.

The communication IF 110 has a communication interface conforming to the communication standards of the communication network N1, and is capable of connecting the information processor 200 through the communication network N1. The communication IF 110 receives print data transmitted from the connected information processor 200, and transmits information to be given to the information processor 200. The communication IF 110 controls such transmission and reception of various data. Moreover, the communication IF 110 has a function to receive print data transmitted from the information processor 200 and develops the print data into image data for output, and outputs the image data obtained by development to the image memory 107.

The facsimile communication IF 111 comprises a circuit terminating device for connecting an external facsimile machine 300, and enables transmission and reception of facsimile data through the facsimile communication network N2. Therefore, the facsimile communication IF 111 comprises a decoding circuit for decoding the received facsimile data, and an encoding circuit for encoding facsimile data to be transmitted. The facsimile communication IF 111 executes such transmission and reception of facsimile data, and the encoding process and the decoding process. Note that the image data for output obtained by decoding the received facsimile data is outputted to the image memory 107.

The following description will specifically explain the contents of processing to be executed by the image processing section 108 when detecting a detection pattern from an image read by the image reading section 106. FIG. 3 is an explanatory view for explaining the state when reading a document. As described above, the image reading section 106 comprises the CCD line sensor constructed by arranging many CCDs in the main scanning direction, and obtains line data (image data) in the main scanning direction about a document S placed on the glass document mounting 106a. Moreover, the image reading section 106 obtains image data on the entire surface or a specified range of the document S by acquiring line data at a predetermined sampling cycle while scanning the light source in the sub-scanning direction by moving it with a stepping motor (not shown). Note that the example shown in FIG. 3 illustrates a state of the document S seen from the lower side of the document mounting 106a, and this document S is provided with the first detection pattern 10 as one of detection patterns.

FIGS. 4A and 4B are schematic views showing the structures of detection patterns. In this embodiment, a mark including a Japanese character meaning "secret" written in a circle ("circled secret" mark) is adopted as the first detection pattern 10, and a mark including a Japanese character meaning "important" written in a circle (mark meaning "important") is adopted as the second detection pattern 20. In other words, as shown in FIG. 4A, the first detection pattern 10 is composed of a character area 11 including the character meaning "secret" and a circular boundary line 12. As shown in FIG. 4B, the second detection pattern 20 is composed of a character area 21 including the character meaning "important" and a circular boundary line 22.

In order to detect these detection patterns 10 and 20 from the inputted image data, the image processing section 108 first binarizes the inputted image data. In the inputted image data, although each pixel has 256 levels for each of RGB colors, the levels are converted into two levels of white (pixel value is 1) and black (pixel value is 0). At this time, it may be possible to perform the process of decreasing the resolution of the image data. For example, if the inputted image data has 600 dpi (dots per inch), it may be possible to decrease the resolution to 200 dpi and perform the subsequent process by using the resulting data.

Figure 5A:
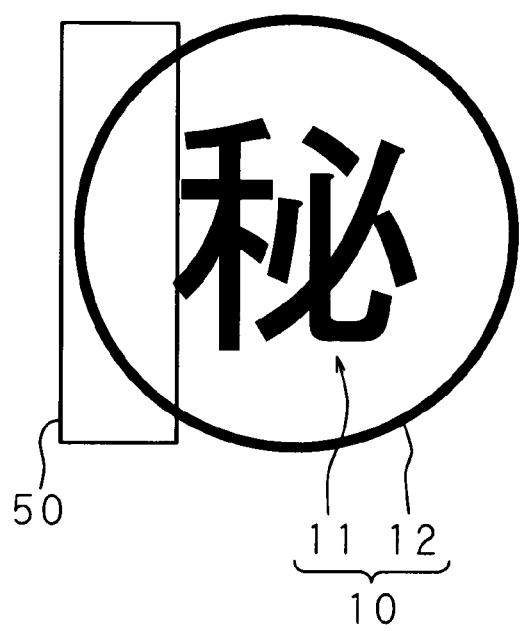
FIGS. 5A and 5B are explanatory views for explaining the contents of processing performed when detecting a boundary line.
Figure 5B:
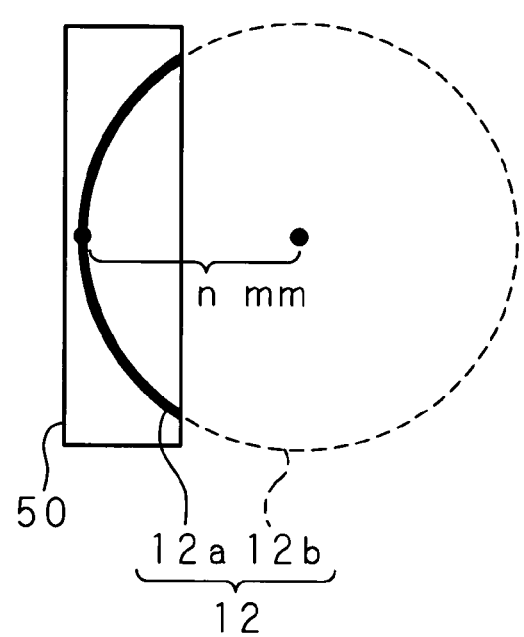

Next, the image processing section 108 detects the boundary line 12 of the first detection pattern 10, or the boundary line 22 of the second detection pattern 20, from the binarized image data. FIGS. 5A and 5B are explanatory views for explaining the contents of processing performed when detecting the boundary lines 12 and 22. In this embodiment, as shown in FIG. 5A, the boundary lines 12 and 22 are detected by using a rectangular detection window 50 with a predetermined size. For example, suppose that the radius of a circle formed by the boundary line 12 of the first detection pattern 10 is n [mm]. When the entire image was scanned by shifting the detection window 50 one dot at a time in the main scanning direction and the sub-scanning direction, if the radius of a curvature appeared in this detection window 50 was n [mm], as shown in FIG. 5B, a determination is made that the boundary line 12 of the first detection pattern 10 was detected, based on an arc 12a in the detection window 50 and a remaining arc 12b. The same process is also performed for the second detection pattern 20.

Figure 6:
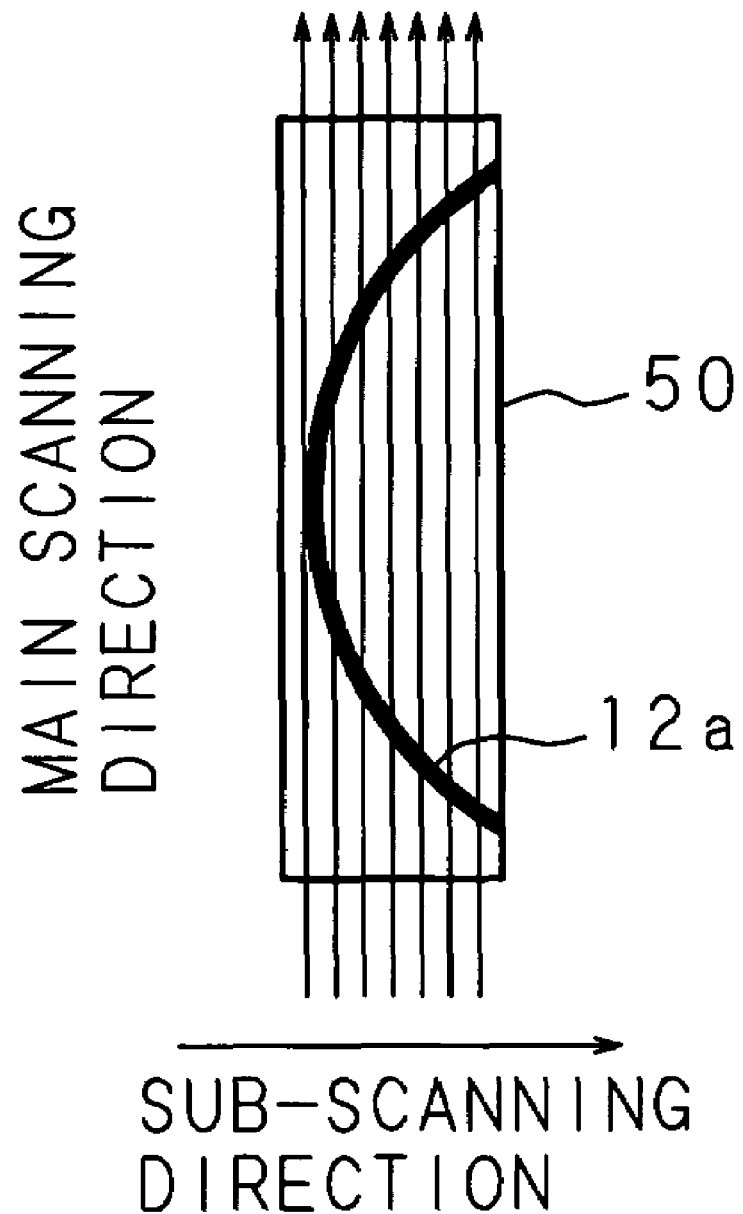
FIG. 6 is an explanatory view for explaining the size of a detection window.

The following description will more specifically explain the technique of detecting the boundary line 12 of the first detection pattern 10 and the boundary line 22 of the second detection pattern 20. FIG. 6 is an explanatory view for explaining the size of the detection window 50. In this embodiment, the detection window 50 with a size capable of covering six scan lines in the sub-scanning direction is used. Here, scanning does not mean scanning performed by the hardware in the image reading section 106, but means scanning performed by a software process in the image processing section 108, and the scanning interval in the sub-scanning direction corresponds to the unit of a pixel.

Figure 7:
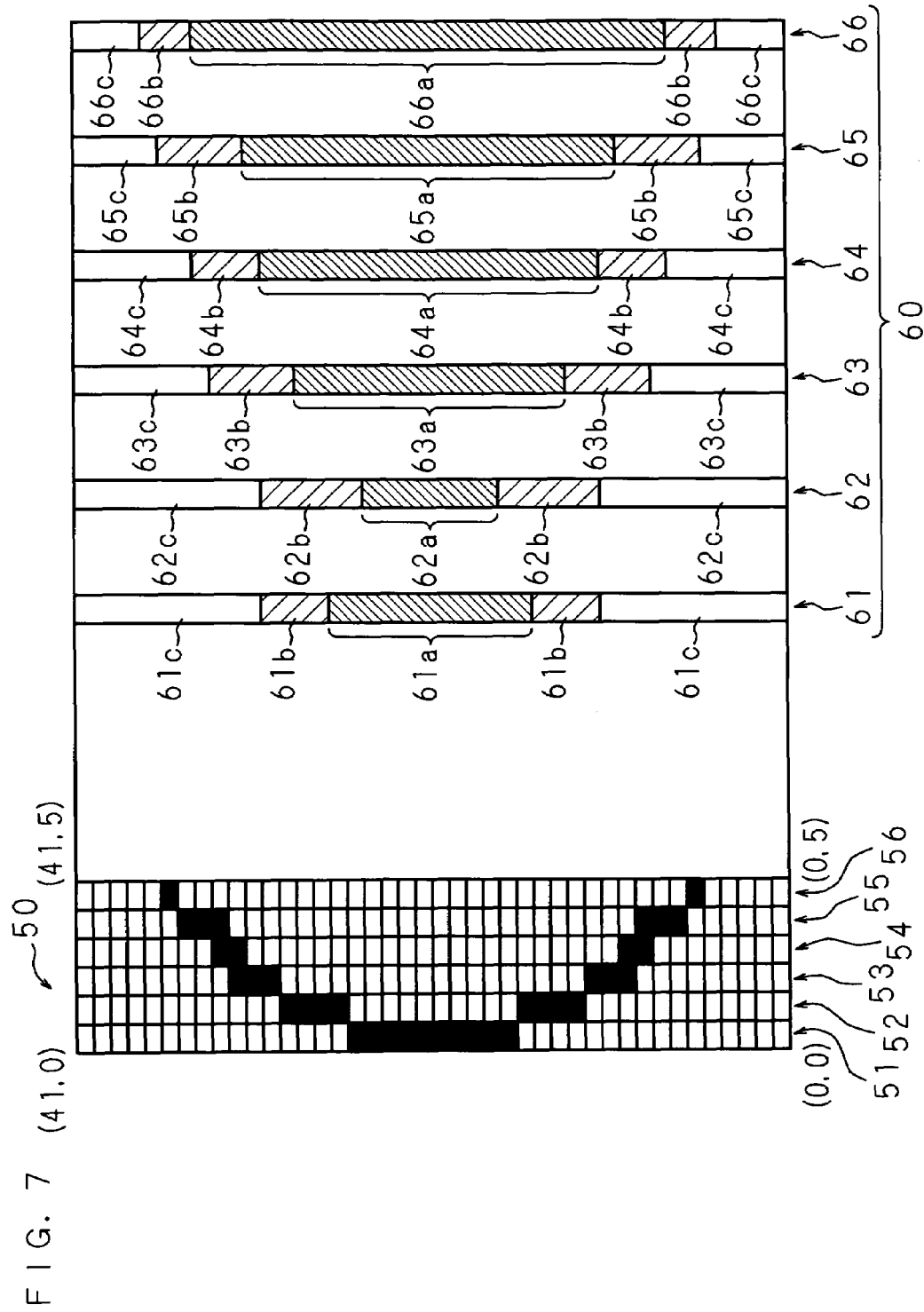
FIG. 7 is a schematic view showing the relation between the state of an image in the detection window and a template used for detecting a boundary line.

FIG. 7 is a schematic view showing the relation between the state of an image in the detection window 50 and a template used for detecting the boundary lines 12 and 22. FIG. 8 is a table showing a determination condition based on the template. The image in the detection window 50 is composed of line data 51 through 56 corresponding to six pixels in the sub-scanning direction, and each of the line data 51, 52, ..., 56 includes 42 pixels in the main scanning direction. In FIG. 7, a white cell represents a pixel with the pixel value 1, and a black cell represents a pixel with the pixel value 0. For example, in the line data 51, the pixels values of the pixels corresponding to coordinates (0, 0) through (15, 0) and coordinates (26, 0) through (41, 0) are 1, and the pixels values of the pixels corresponding to coordinates (16, 0) through (25, 0) are 0.

On the other hand, the template 60 is composed of a first line 61, a second line 62, a third line 63, a fourth line 64, a fifth line 65, and a sixth line 66 corresponding to the line data 51 through 56 in the detection window 50. Each of the first line 61 through the sixth line 66 includes 42 pixels in the main scanning direction, and is divided into three areas in the main scanning direction. For example, the first line 61 is divided into a first area 61a from coordinates (15, 0) to (26, 0), second areas 61b and 61b from coordinates (11, 0) to (14, 0), and coordinates (27, 0) to (30, 0), and third areas 61c and 61c from coordinates (0, 0) to (0, 10) and coordinates (31, 0) to (41, 0). The second line 62 through the sixth line 66 are also divided in the same manner, and have preset three areas in the main scanning direction.

Moreover, the number of black pixels in each area is defined as shown in FIG. 8. In other words, when an image in the detection window 50 is divided into line data 51 through 56, if the distribution of black pixels in each of the line data 51, 52, ..., 56 matches the distribution in the template shown in FIG. 8, a determination is made that the image is the arc 12a constituting a part of the boundary line 12 of the first detection pattern 10 (or an arc constituting a part of the boundary line 22 of the second detection pattern 20). For example, when the line data 51 shown in FIG. 7 and the first line 61 of the template 60 are compared, the number of black pixels in the first area 61a is 10, the number of black pixels in the second areas 61b and 61b is 0, and the number of black pixels in the third area 61c and 61c is 0, and therefore the conditions of the first line shown in FIG. 8 are satisfied. Similarly, when the relationship between other line data 52 through 56 and the second line 62 through the sixth line 66 of the corresponding temperate 60 is examined, the conditions shown in FIG. 8 are satisfied, and it is found that the image in the detection window 50 shown in FIG. 7 is the boundary line 12 of the first detection pattern or the boundary line 22 of the second detection pattern 20.

Thus, in the image processing section 108, when the number of black pixels in each of the line data 51 through 56 in the detection window 50 is within a range defined by the template, a determination is made that the boundary line 12 of the first detection pattern 10 or the boundary line 22 of the second detection pattern has been detected. Hence, even when the image read by the image reading section 106 has an unclear, blurred, thickened or deviated portion, etc., it is possible to highly accurately detect an object to be detected.

Further, when the image is scanned using the detection window 50, since the number of pixels used for one determination process is reduced compared to scanning the entire image collectively, it is possible to quickly perform the detection process. Also, since the determination is made by taking into consideration the relevancy of adjacent pixels, the determination accuracy is improved compared to scanning the image based on individual pixels.

Figures 9A, 9B:
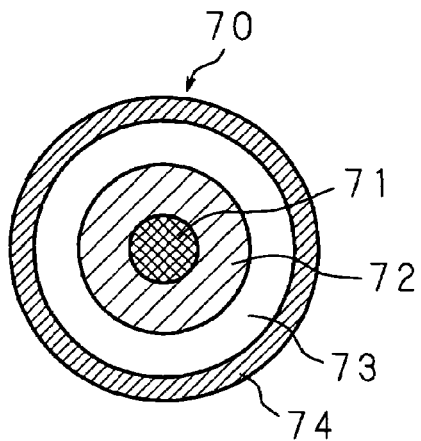
FIGS. 9A and 9B are explanatory views for explaining the relationship between an example of dividing a detection area and the distribution of the number of pixels.

In addition, by estimating a circular boundary line from the detected arc, it is possible to extract a circular area (detection area) that may possibly include the first detection pattern 10 or the second detection pattern 20. In order to discriminate the type of an image included in this detection area, the image processing section 108 divides the detection area into four divisional areas, and examines the number of pixels in each divisional area (that is, the distribution of the number of pixels in the detection area). FIGS. 9A and 9B are explanatory views for explaining the relationship between an example of dividing a detection area and the distribution of the number of pixels. FIG. 9A shows a dividing example. In this example, an extracted detection area 70 is concentrically divided so that an area enclosed by a circumference with the smallest radius is a first divisional area 71, an area enclosed by this circumference and a circumference with the second smallest radius is a second divisional area 72, an area enclosed by this circumference and a circumference with the third smallest radius is a third divisional area 73, and an area enclosed by this circumference and the outer circumference is a fourth divisional area 74.

FIG. 9B shows a table defining the range of the number of pixels in each of the divisional areas 71, 72, 73 and 74. According to this table, a determination is made as to whether or not the first detection pattern 10 or the second detection pattern 20 is included. For example, when the number of black pixels in the first divisional area 71 is within a range of 280 to 320, the number of black pixels in each of the second divisional area 72 and third divisional area 73 is within a range 290 to 330, and the number of black pixels in the fourth divisional area 74 is 480 or more, that is, when the distribution of black pixels in the detection area 70 satisfies a first criterion, the image is determined to be the first detection pattern 10. Similarly, when the distribution of black pixels in the detection area 70 satisfies a second criterion, the image is determined to be the second detection pattern 20. Note that the table shown in FIG. 9B is pre-stored in the memory installed in the image processing section 108, and a calling process or a rewriting process is executed according to an instruction from the CPU 101.

Figures 10A, 10B:
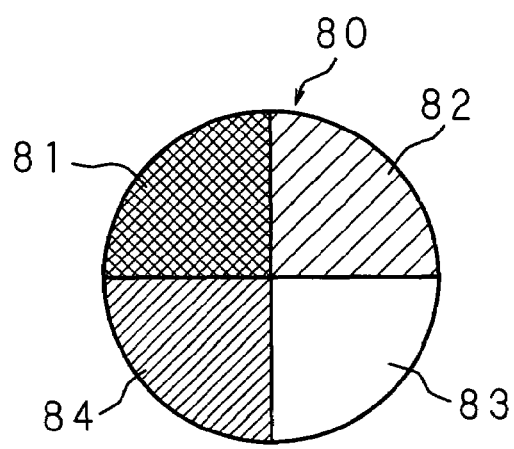
FIGS. 10A and 10B are explanatory view for explaining the relationship between another example of dividing a detection area and the distribution of the number of pixels.

Note that the technique of dividing the detection area is not limited to the above-mentioned technique. FIGS. 10A and 10B are explanatory views for explaining the relationship between another example of dividing a detection area and the distribution of the number of pixels. When a detection pattern in which black pixels are distributed substantially uniformly in a detection area is used, as shown in FIG. 10A, it may be possible to divide a detection area 80 into four areas, namely, a first divisional area 81, a second divisional area 82, a third divisional area 83 and a fourth divisional area 84, by two lines passing through the center of the detection area 80 and crossing each other at a right angle. In this case, since the number of black pixels in each of the divisional areas 81, 82, 83 and 84 is substantially uniform, it is not necessary to define a range of the number of pixels for each of the divisional areas 81, 82, 83 and 84. FIG. 10B shows criteria common to the respective divisional areas.

Figure 11:
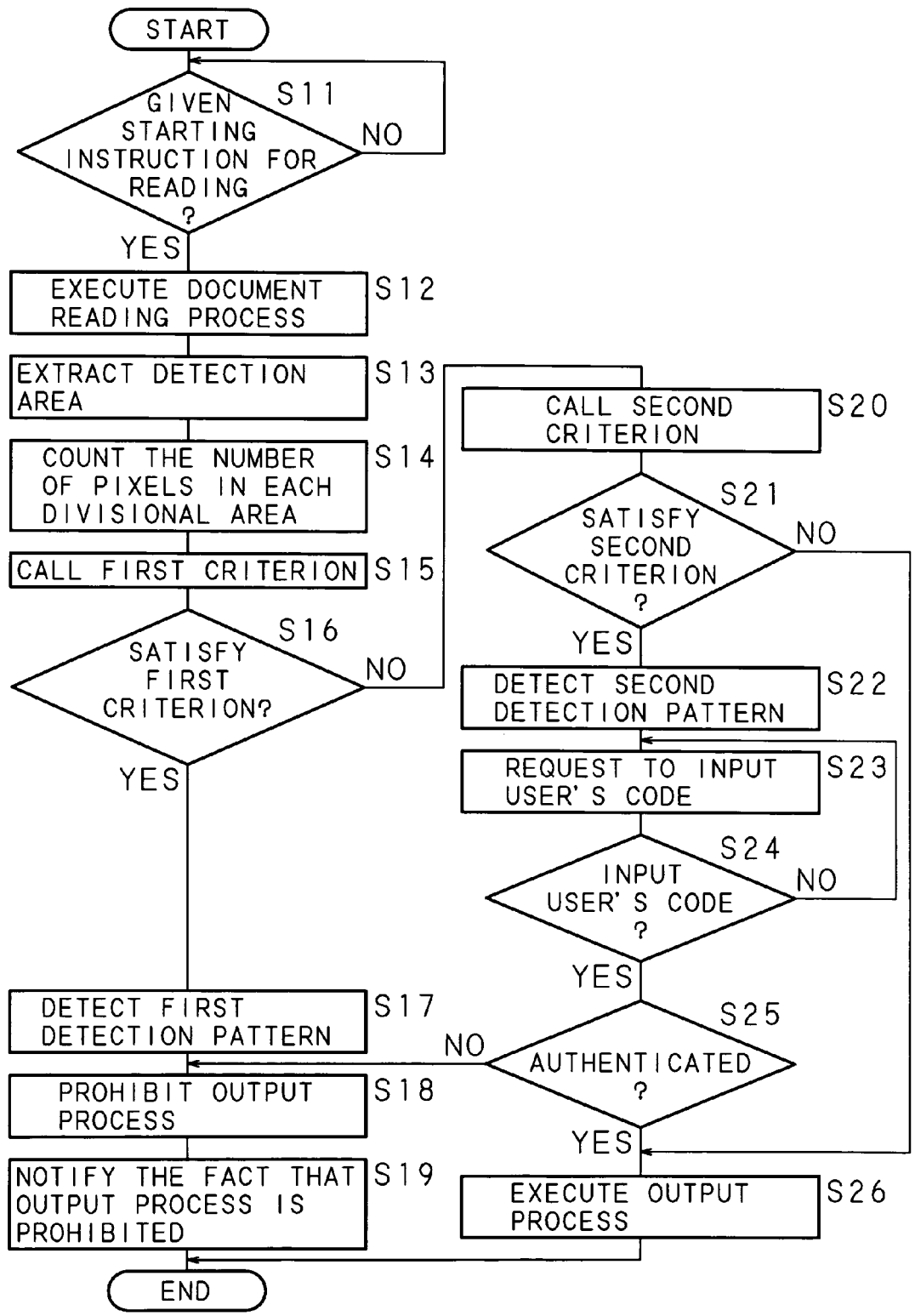
FIG. 11 is a flowchart for explaining the processing steps for copying a document.

The following description will explain the processing steps executed by the digital multi-function machine 100 when copying a document. FIG. 11 is a flowchart for explaining the processing steps for copying a document. First, the digital multi-function machine 100 monitors information inputted through the operating section 105a of the operating panel 105 and determines whether or not there is an instruction to start reading a document (step S11). When a determination is made that there is not an instruction to start reading (S11: NO), the CPU 101 waits until an instruction to start reading is given.

When a determination is made that an instruction to read a document is given (S11: YES), the CPU 101 controls the image reading section 106 to execute the document reading process (step S12). More specifically, the image reading section 106 reads an image within a specified range by turning on the light source and acquiring image data in the main scanning direction while moving the light source in the sub-scanning direction and scanning a document in the specified range. The image data obtained by the image reading section 106 is transferred to the image processing section 108 via the image memory 107.

Next, the CPU 101 controls the image processing section 108 to extract a circular area with a predetermined radius as a detection area by using the above-mentioned technique (step S13). In other words, the image processing section 108 binarizes the image data transferred via the image memory 107, and extracts the circular area as an object to be detected by pattern matching using the template 60.

Further, the CPU 101 controls the image processing section 108 to divide the extracted detection area into four areas and then count the number of pixels having a pixel value corresponding to black in each divisional area (step S14).

Next, the CPU 101 calls the first criterion pre-stored in the memory in the image processing section 108 (step S15), and determines whether or not the counted number of pixels in each divisional area satisfies the first criterion (step S16). When a determination is made that the first criterion is satisfied (S16: YES), the CPU 101 determines that the first detection pattern 10 (a "circled secret" mark in this embodiment) has been detected (step S17).

Then, the CPU 101 prohibits the output process (step S18), and gives a notification indicating that the output process is prohibited (step S19). Here, prohibition of the output process is realized by prohibiting a transfer of image data held in the image memory 107 to the image recording section 109. The notification indicating that the output process is prohibited is given by displaying a massage indicating this on the display section 105b of the operating panel 105.

In step S16, when a determination is made that the first criterion is not satisfied (S16: NO), the CPU 101 calls the second criterion pre-stored in the memory in the image processing section 108 (step S20), and determines whether or not the number of pixels counted in each divisional area satisfies the second criterion (step S21). When a determination is made that the second criterion is satisfied (S21: YES), the CPU 101 determines that the second detection pattern 20 (the mark meaning "important" in this embodiment) has been detected (step S22).

When the second detection pattern 20 is detected, the CPU 101 requests a user to input a user's code (step S23). Here, a user's code is an authentication code (for example, a four-digit number) allocated to each user, and the authentication code of a person authorized to use the machine is pre-stored in the ROM 103 in the digital multi-function machine 100. Moreover, the request for the input of a user's code is made by displaying a message requesting the input on the display section 105b of the operating panel 105.

The CPU 101 monitors information inputted through the operating section 105a and determines whether or not the user's code has been inputted (step S24). When a determination is made that a user's code has not been inputted (S24: NO), the CPU 101 returns the process to step S23. On the other hand, when a determination is made a user's code has been inputted (S24: YES), the CPU 101 determines whether or not the user can be authenticated by collating the inputted user's code with the user's code stored in the ROM 103 (step S25). When a determination is made that the user cannot be authenticated (S25: NO), the CPU 101 gives a notification indicating that the output process is prohibited (S19). On the other hand, when a determination is made that the user can be authenticated (S25: YES), the CPU 101 transfers image data held in the image memory 107 to the image recording section 109, and executes the output process (step S26).

On the other hand, when a determination is made in step S21 that the second criterion is not satisfied (S21: NO), the CPU 101 determines that copying of the document read in step S12 is not restricted, and then transfers the image data held in the image memory 107 to the image recording section 109 and executes the output process (S26).

Note that although this embodiment illustrates a mode for detecting whether or not image data obtained by read an image of a document includes the detection pattern 10 or 20, it is of course possible to detect the detection pattern 10 or 20 by the same technique as above for image data developed from print data received by the communication IF 110 and image data obtained by decrypting facsimile data received by facsimile communication IF 111. In this case, a notification to be given in step S19 may be given by transmitting information indicating that the output process is prohibited to the information processor 200 that is the source of the print data, or the facsimile machine 300 that is the source of the facsimile data.

Further, in this embodiment, although objects to be detected by the digital multi-function machine 100 are two types of patterns, namely the first detection pattern 10 represented by the "circled secret" mark, and the second detection pattern 20 represented by the mark meaning "important", it is, of course, not necessary to limit the objects to be detected to these marks. In addition, although the patterns to be detected are of two types, it is of course possible to detect three or more types of patterns by setting a range of the number of pixels for three or more types of marks in advance. Besides, in this embodiment, although the boundary line 12 of the first detection pattern 10 and the boundary line 22 of the second detection pattern 20 are circular, they are not necessarily circular, and, needless to say, it is possible to detect polygons such as a rectangle and a triangle, or any predetermined shapes, by changing the structure of the template 60.

Moreover, in this embodiment, although the type of a pattern included in the detection area is detected by calling the first and second criteria stored in the memory of the image processing section 108 and comparing them with the distribution of black pixels counted in a detection area. However, when it is necessary to change the pattern to be detected, it may be possible to change the relation between the distribution of pixels stored in the memory and the pattern to be detected. At this time, it is preferable to receive the information about the relation between the distribution of pixels and the pattern by the operating panel 105, and update the information stored in the memory in the image processing section 108.

Besides, in this embodiment, when the first detection pattern 10 is detected, the output process is prohibited, and, when the second detection pattern 20 is detected, the output process is permitted after authenticating a user. However, instead of prohibiting the output process, it may be possible to perform the output process after compositing noise, or a message indicating that copying is prohibited, with an image to be outputted.

Further, in this embodiment, although inputted image data is binarized prior to extracting a detection area, it may be possible to omit this process. When the binarization of image data is omitted, it is preferable to use a table specifying a tolerance range of the number of pixels for each of RGB values, instead of the table shown in FIG. 8.

Embodiment 2

In Embodiment 1, after making a determination based on the first criterion, the second criterion is called, if necessary, and a determination is made based on the second criterion. However, it may be possible to call both the first criterion and the second criterion in advance.

Figure 12:
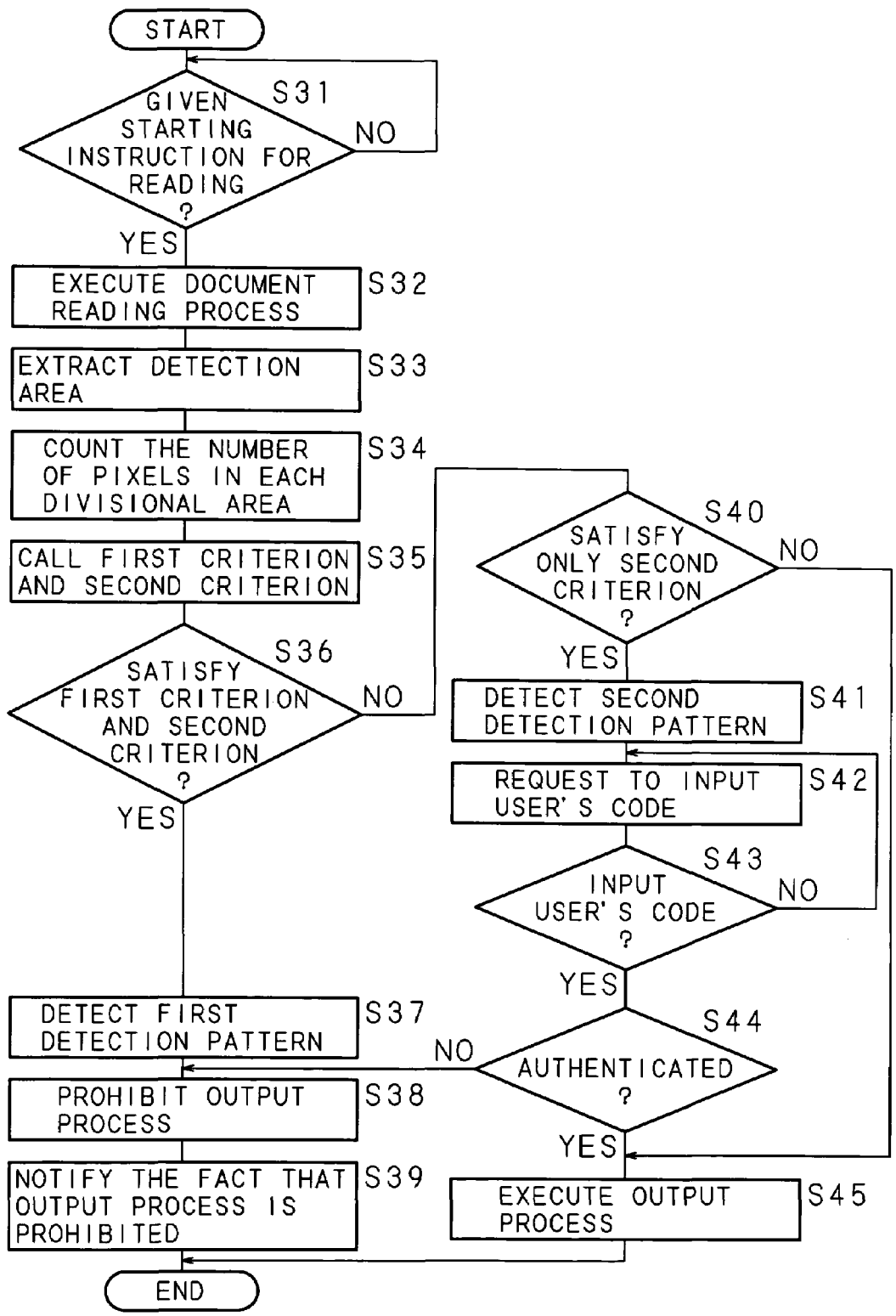
FIG. 12 is a flowchart for explaining the processing steps for copying a document.

FIG. 12 is a flowchart for explaining the processing steps for copying a document. First, the CPU 101 of the digital multi-function machine 100 monitors information inputted through the operating section 105*a* of the operating panel 105 and determines whether or not there is an instruction to start reading a document (step S31). When a determination is made that there is not an instruction to start reading (S13: NO), the CPU 101 waits until an instruction to start reading is given.

When a determination is made that an instruction to start reading a document is given (S31: YES), the CPU 101 controls the image reading section 106 to execute the document reading process (step S32), binarizes the read image data and then extracts a circular area having a predetermined radius as a detection area by using the above-mentioned technique (step S33). The CPU 101 controls the image processing section 108 to divide the extracted detection area into four areas and then count the number of pixels having a pixel value corresponding to black in each of the divisional areas (step S34).

Next, the CPU 101 calls the first criterion and second criterion pre-stored in the memory in the image processing section 108 (step S35), and determines whether or not the counted number of pixels in each divisional area satisfies both the first criterion and second criterion (step S36). When a determination is made that the counted number of pixels satisfies both the first criterion and second criterion (S36: YES), the CPU 101 determines that the first detection pattern 10 has been detected (step S37). When the first detection pattern 10 is detected, the CPU 101 prohibits the output process based on the image data read in step S32 (step S38), and gives a notification indicating that the output process is prohibited (step S39).

On the other hand, when a determination is made that either the first criterion or second criterion is not satisfied (S36: NO), the CPU 101 determines whether only the second criterion is satisfied (step S40). When a determination is made that only the second criterion is satisfied (S40: YES), the CPU 101 determines that the second detection pattern 20 has been detected (step S41).

When the second detection pattern 20 is detected, the CPU 101 requests the user to input a user's code (step S42). Then, the CPU 101 monitors information inputted through the operating section 105*a* and determines whether or not a user's code has been inputted (step S43). When a determination is made that a user's code has not been inputted (S43: NO), the CPU 101 returns the process to step S42.

On the other hand, when a determination is made that a user's code has been inputted (S43: YES), the CPU 101 determines whether or not the user can be authenticated by collating the inputted user's code with the user's code stored in the ROM 103 (step S44). When a determination is made that the user cannot be authenticated (S44: NO), the CPU 101 prohibits the output process (S38), and gives a notification indicating that the output process is prohibited (S39). On the other hand, when a determination is made that the user can be authenticated (S44: YES), the CPU 101 transfers image data held in the image memory 107 to the image recording section 109, and executes the output process (step S45).

On the other hand, when a determination is made in step S40 that the second criterion is not satisfied (S40: NO), the CPU 101 transfers the image data held in the image memory 107 to the image recording section 109 and executes the output process (S45).

Embodiment 3

In the above-described embodiment, although the first criterion and second criterion are both stored in the memory in the image processing section 108, it may be possible to store only one criterion (for example, the first criterion) in the memory in the image processing section 108, and calculate the other criterion (for example, the second criterion) by arithmetic processing performed by the CPU 101.

FIG. 13 is a conceptual view showing a table specifying the divisional areas and the range of the number of pixels. In the example shown in FIG. 13, the range of the number of pixels based on the nth criterion (n=1, 2, 3 . . . ) is arithmetically described. However, in actual practice, only the range of the number of pixels according to the first criterion may be stored, and the second criterion and the following criteria may be obtained by arithmetic processing of the CPU 101 when it is necessary to update the criterion. In other words, when updating the criterion, an operation to decrease the lower limit of the range of the number of pixels by 10 percent and increase the upper limit by 10 percent is performed, and a range increased by 20 percent as a whole is set as a new criterion.

Thus, in this embodiment, since it is possible to create other criterion from one criterion, even when there are many patterns to be detected, it is not necessary to store the criteria defined for each of the patterns, and therefore there is an advantage that it is not necessary to increase the memory capacity.

Embodiment 4

Although Embodiment 1 illustrates a mode for detecting the detection pattern 10 (20) capable of being separated into the character area 11 (21) and the boundary line 12 (22), the present invention is also applicable to the case where an object to be detected is a pattern is having no boundary line.

Figures 14A, 14B:
FIGS. 14A and 14B are explanatory views for explaining an example of a detection pattern detected in this embodiment.

FIGS. 14A and 14B are explanatory views for explaining an example of a detection pattern detected in this embodiment. As shown in FIG. 14B, when detection patterns are character areas including alphabets ("d", "o", "d" and "q"), a common portion of the respective detection patterns is first detected, and then the distribution of the number of pixels in a virtual area having a predetermined size and including the common portion is examined to determine whether the character included in the virtual area is "c", "o", "d" or "q".

For example, if a common portion to be detected at the first stage is a part of the letter "c" as shown in FIG. 14A, it is possible to detect the common portion by using the template 60 explained in Embodiment 1. Next, by setting a rectangular virtual area including the detected common portion substantially in the center, counting the number of black pixels in the virtual area, and then referring to the values of the table as shown in FIG. 14B, it is possible to determine which character area including "c", "o", "d" or "q" is the detection pattern.

FIGS. 15A and 15B are explanatory views for explaining another example of detection patterns detected in this embodiment. Although the detection pattern shown in FIG. 14B is a pattern with a common portion detectable by using the template 60 explained in Embodiment 1, a common portion to be detected may be arbitrarily set by suitably setting the number of lines in the template, the areas in each line, and a range of the number of pixels to be detected in each area. In the example shown in FIGS. 15A and 15B, the letter "P" is set as a common portion, and character areas including the letter "P" or "R" are detected as detection patterns.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus for detecting and distinguishing an image pattern from a plurality of image patterns each of which is configured with a circular area and an inner area arranged in the circular area to have a common image pattern portion and a non-common image pattern portion, comprising:
a table representing correspondences between the plurality of image patterns and numbers of pixels;
a rectangular detection window for detecting an arc segment image included in an image, the arc segment image being a segment of the circular area and being the common image pattern portion of the plurality of image patterns: and
a controller capable of performing operations of:
receiving image data composed of a plurality of pixels;
detecting the arc segment image included in the image based on the received image data, in comparison with a pixel distribution in the rectangular detection window and the correspondences represented by the table;
determining plural circular areas having different radiuses, in accordance with the detected arc segment image, each of the plural circular areas being concentric with the circular area;
calculating numbers of pixels included in each of the determined plural circular areas; and
distinguishing, from the plurality of image patterns, the image pattern included in the received image data on the basis of the calculated numbers of pixels and the correspondences represented by the table.

2. The image processing apparatus according to claim 1, further comprising a table that defines a relation between a type of an image to be detected and the ratio of pixels having the pixel value in the area including the image, wherein the type of the image is detected by referring to the relation defined in said table.

3. The image processing apparatus according to claim 2, wherein said controller is further capable of performing operations of:
receiving information about the relation; and
changing said table based on the received information.

4. An image reading apparatus comprising:
a reading section for reading an image recorded on a sheet; and
an image processing apparatus as set forth in claim 1, wherein an area is extracted from an image read by said reading section, and a type of an image included in the extracted area is detected.

5. The image reading apparatus according to claim 4, further comprising a controller capable of performing operations of:
determining whether or not the type of the image detected by said image processing apparatus is a predetermined type; and
outputting information indicating a determination result when a determination is made that the detected type is the predetermined type.

6. An image recording apparatus comprising:
an image reading apparatus as set forth in claim 4; and
a recording section for recording an image read by said image reading apparatus on a sheet.

7. The image recording apparatus according to claim 6, further comprising a controller capable of performing operations of:
determining whether or not the type of the image detected by said image reading apparatus is a predetermined type; and
prohibiting recording of the image read by said image reading apparatus on a sheet when a determination is made that the detected type is the predetermined type.

8. The image recording apparatus according to claim 6, further comprising a controller capable of performing operations of:
determining whether or not the type of the image detected by said image reading apparatus is a predetermined type;
receiving information about a user when a determination is made that the detected type is the predetermined type;
authenticating a user based on the received information; and
prohibiting recording of the image read by said image reading apparatus on a sheet when a determination is made that a user cannot be authenticated.

9. An image processing apparatus for detecting and distinguishing an image pattern from a plurality of image patterns each of which is configured with a circular area and an inner area arranged in the circular area to have a common image pattern portion and a non-common image pattern portion, comprising:
a table representing correspondences between the plurality of image patterns and numbers of pixels;
a rectangular detection window for detecting an arc segment image included in an image, the arc segment image being a segment of the circular area and being the common image pattern portion of the plurality of image patterns; and means for receiving image data composed of a plurality of pixels;

means for detecting the arc segment image included in the image based on the received image data, in comparison with a pixel distribution in the rectangular detection window and the correspondences represented by the table;

means for determining plural circular areas having different radiuses, in accordance with the detected arc segment image, each of the plural circular areas being concentric with the circular area;

means for calculating numbers of pixels included in each of the determined plural circular areas; and means for distinguishing, from the plurality of image patterns, the image pattern included in the received image data on the basis of the calculated numbers of pixels and the correspondences represented by the table.

10. The image processing apparatus according to claim 9, further comprising a table that defines a relation between a type of an image to be detected and the ratio of pixels having the pixel value in the area including the image, wherein the type of the image is detected by referring to the relation defined in said table.

11. The image processing apparatus according to claim 10, further comprising:

means for receiving information about the relation; and
means for changing said table based on the received information.

12. An image reading apparatus comprising:

scan means for reading an image recorded on a sheet; and an image processing apparatus as set forth in claim 9, wherein an area is extracted from an image read by said scan means, and a type of an image included in the extracted area is detected.

13. The image reading apparatus according to claim 12, further comprising:

means for determining whether or not the type of the image detected by said image processing is a predetermined type; and means for outputting information indicating a determination result when a determination is made that the detected type is the predetermined type.

14. An image recording apparatus comprising:

an image reading apparatus as set forth in claim 12; and
means for recording an image read by said image reading apparatus on a sheet.

15. The image recording apparatus according to claim 14, further comprising:

means for determining whether or not the type of the image detected by said image reading apparatus is a predetermined type; and means for prohibiting recording of the image read by said image reading apparatus on a sheet when a determination is made that the detected type is the predetermined type.

16. The image recording apparatus according to claim 14, further comprising:

means for determining whether or not the type of the image detected by said image reading apparatus is a predetermined type;

means for receiving information about a user when a determination is made that the detected type is the predetermined type;

means for authenticating a user based on the received information; and means for prohibiting recording of the image read by said image reading apparatus on a sheet when a determination is made that a user cannot be authenticated.

* * * * *